(12) United States Patent
Decoux

(10) Patent No.: US 12,346,756 B2
(45) Date of Patent: Jul. 1, 2025

(54) TWO-DIMENSIONAL BARCODE, METHOD AND SYSTEM FOR ENCODING DATA INTO SAID TWO-DIMENSIONAL BARCODE, AND METHOD AND SYSTEM FOR IMAGING AND DECODING SAID TWO-DIMENSIONAL BARCODE

(71) Applicant: SICPA HOLDING SA, Prilly (CH)

(72) Inventor: Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/723,799

(22) PCT Filed: Dec. 16, 2022

(86) PCT No.: PCT/EP2022/086371
§ 371 (c)(1),
(2) Date: Jun. 24, 2024

(87) PCT Pub. No.: WO2023/117764
PCT Pub. Date: Jun. 29, 2023

(65) Prior Publication Data
US 2025/0053768 A1    Feb. 13, 2025

(30) Foreign Application Priority Data

Dec. 23, 2021 (EP) .................................... 21217645

(51) Int. Cl.
G06K 19/06    (2006.01)
(52) U.S. Cl.
CPC ... *G06K 19/0614* (2013.01); *G06K 19/06037* (2013.01); *G06K 19/06075* (2013.01)

(58) Field of Classification Search
CPC ......... G06K 19/0614; G06K 19/06037; G06K 19/06075; G06K 19/06056
See application file for complete search history.

(56) References Cited

U.S. PATENT DOCUMENTS 7,751,585 B2    7/2010    Jancke
7,936,901 B2    5/2011    Jancke
(Continued)

FOREIGN PATENT DOCUMENTS

EP    1157356    8/2004

OTHER PUBLICATIONS

Marco Querini et al: "Reliability and data density in high capacity color barcodes", Computer Science and Information Systems, vol. 11, No. 4, Jan. 1, 2014 (Jan. 1, 2014), pp. 1595-1615.
(Continued)

*Primary Examiner* — Jamara A Franklin
(74) *Attorney, Agent, or Firm* — Muncy, Geissler, Olds & Lowe, P.C.

(57) ABSTRACT

The invention relates to a 2D barcode comprising barcode elements, made up of elementary 2D color modules and of which encoded data are split into a plurality of 2D data blocks made of chunks, each element including a 2D alignment pattern AP of which modules have colors representative of a color palette, a configurable error-correcting code and a locator including an orientation pattern and encoded locator data indicating a size of said barcode element BE, a size of said element, a size of the data blocks DBs of said barcode element, the number of colors of the corresponding color palette, and a level of error correction of the error-correcting code.

15 Claims, 10 Drawing Sheets

(56) References Cited

U.S. PATENT DOCUMENTS

| | | | |
|---|---|---|---|
| 9,454,688 B1 | 9/2016 | Fang | |
| 2006/0196950 A1 | 9/2006 | Killiccote | |
| 2016/0292486 A1* | 10/2016 | Prusik | G06K 19/06046 |
| 2020/0034590 A1* | 1/2020 | Howard | G06K 7/1417 |
| 2024/0095479 A1* | 3/2024 | Nishizaki | G06K 19/06037 |

OTHER PUBLICATIONS

GS1 DataMatrix Guideline, release 2.5.1, Jan. 2018, 60 pages.
ISO/IEC 18004 2000 (E) published on Jun. 15, 2000, 122 pages.
International Search Report and Written Opinion issued with respect to application No. PCT/EP2022/086371.

* cited by examiner

TWO-DIMENSIONAL BARCODE, METHOD AND SYSTEM FOR ENCODING DATA INTO SAID TWO-DIMENSIONAL BARCODE, AND METHOD AND SYSTEM FOR IMAGING AND DECODING SAID TWO-DIMENSIONAL BARCODE

TECHNICAL FIELD

The present invention relates to the technical field of two-dimensional barcodes, and particularly to 2D barcodes of high density storage of data and color barcodes. The invention further relates to encoding/decoding methods and systems of 2D barcodes.

BACKGROUND OF THE INVENTION

Two-dimensional ("2D") barcodes (e.g. QR Code, DataMatrix code, PDF417 code, Aztec Code, MaxiCode, Semacode, SPARQCode, etc.) are of widespread use for encoding data with specific symbologies of their modules (i.e. "elementary cells", for example the white or black square modules of a QR code). This success generates a growing need of two-dimensional barcodes with increased data content.

A typical DataMatrix code (see the GS1 DataMatrix Guideline, release 2.5.1, January 2018) is a 2D barcode consisting of black and white modules (or dots) arranged in either a square or rectangular pattern, and forming a matrix. The information to be encoded can be text or numeric data. Usual data size is from a few bytes up to 1556 bytes (for a 144×144 modules barcode) and can store up to 2335 alphanumeric characters. The length of the encoded data depends on the number of modules in the matrix. Moreover, error correction codes (e.g. Reed-Solomon) are often used to increase reliability so that even if one or more modules are damaged and unreadable, the encoded data can nevertheless be read and decoded. For example, if a 144×144 DataMatrix is printed with a dot density of 72 DPI ("Dot Per Inch") corresponding to an inter-dot spacing (or "pitch") of about 353 µm, i.e. with a low resolution printer, its physical size (including a quiet zone) is of 51.5 mm.

A PDF417 barcode ("Portable Data File") has a maximum capacity of 30 codewords (i.e. group of bars and spaces representing one or more numbers, letters, or other symbols) corresponding to 1108 bytes (a byte corresponding to eight bits, i.e. one octet). In size, a PDF417 code takes about four times the area of a DataMatrix code.

An Aztec Code generally uses less space than other matrix barcodes because it does not require a surrounding blank "quiet zone". The Aztec Code can encode a maximum of 1914 bytes of data.

The widely used QR Code has a maximum capacity of 2953 bytes for 177×177 modules. If the QR code is printed with a dot density of 72 DPI, its physical size (including a surrounding quiet zone of one module) is 63 mm.

A first way to address the above need of improving a capacity of a 2D barcode is to increase an overall size of the 2D barcode while keeping constant a size of its modules. However, this way quickly reaches its limits as the available space for marking or displaying (e.g. on a screen of a smartphone) the 2D barcode is generally quite limited. Another way is to limit the overall size of the barcode while reducing a size of the modules. However, this approach quickly faces a problem of capability of marking and/or detecting tiny modules due to a limited resolution of the marking/detecting devices. The actual smartphone optical capacity is typically between 600 and 1000 DPI. Practical test reveals that it is possible to read barcodes at 120 to 180 DPI. Since the encoding capacity depends of the surface, a barcode at 180 DPI is (180/72)×(180/72)=6.25 more times more compact than the same barcode printed at 72 DPI.

Another way is to put more information per module by using colored modules (possibly of different shapes and/or orientations) to encode data. An example is the HCCB ("High Capacity Color Barcode") developed by Microsoft (see the corresponding U.S. Pat. No. 7,936,901 B2 and U.S. Pat. No. 7,751,585 B2). Most symbologies of 2D barcodes printed on a substrate use only two colors: "dark" and "light", i.e. in fact black ink (dark) and substrate color (light), in case the substrate has a light color (commonly referred to a "white" color). However, smartphone uses a camera with a color sensor (e.g. a RGB sensor: Red, Green and Blue), and a color printer uses generally four inks of the "CMYK" color model (i.e. Cyan, Magenta, Yellow and Key or Black). Thus, if we uses five colors instead of two, we increase the density by a factor of about 2.32 (i.e. $Ln(5)/ln(2)$). For example, a HCCB uses a grid of colored triangles to encode data and can use an eight-, four-, or two-color (black-and-white) palette: laboratory tests using standard off-the-shelf printers and scanners have yielded readable eight-color HCCBs being equivalent to approximately 3500 characters per square inch. Nevertheless, there still remains a need to further increase the data content of barcodes.

SUMMARY OF THE INVENTION

In order to overcome the above mentioned drawbacks and limitations of the prior art, a two-dimensional barcode according to the invention has the following combined properties:

- It can use any number of colors from 2 to 13: it is not necessary to use a power of two (e.g. like with the Microsoft code or the open source 2D color barcode JAB, "Just Another Barcode", developed by the Fraunhofer SIT, https://jabcode.org). Several label printers can print on a substrate using black and red colors, and thus the optimum number of colors is three, i.e. the substrate color (generally light or white), black, and red. For a CMYK printer, the barcode can use five colors without any ink superpositions.
- There is no need of a quiet zone (by contrast with, for example, a DataMatrix or a QR code that require one to four blank modules around the code, which increases the area covered by the barcode).
- It can be split in several pieces because it contains barcode locators that embed identifying data which allow the identification of the distinct barcode pieces and an easy reassembly of the full two-dimensional barcode.
- It can have any width/height ratio: this is advantageous as a screen (of a smartphone, tablet etc.), a sheet of paper or a camera sensor are generally not square. The possibility of having an appropriate aspect ratio is also a factor that increases the capacity of the barcode. For example, if one needs to dispose a barcode in a rectangular ⅘ ratio area, one can increase the capacity by 1.33 by using a barcode with the correct proportions.
- The structure of the two-dimensional barcode allows to avoid any thresholding step in the image processing of a digital image of said two-dimensional barcode for detecting a position and orientation of encoded data, and performing local correction of image distortion and illumination gradients, that provides a more robust and reliable decoding.

The structure of the two-dimensional barcode also allows to configure, with respect to a data payload to be encoded, and combine several levels of error-detecting and error-correcting codes to locally correct errors during decoding process, and thus further improves robustness and reliability of decoding such a barcode.

Most often, the substrate on which the barcode is marked (e.g. printed) has a light color and thus a module of which color is light in fact is just a visible two-dimensional area of the substrate itself. The dark color is generally obtained with black ink. In case the substrate color is not light, the light color of a module is in fact obtained with white ink. Thus, in the following we will use interchangeably dark and black, and light and white, respectively.

A first aspect of the invention thus relates to a two-dimensional barcode B marked on a substrate comprising data encoded into at least one barcode element BE made up of elementary two-dimensional modules, a color of a module being selected from a color palette of a plurality of distinct reference colors including dark and light, wherein:
- encoded data of each barcode element BE are split into a plurality of two-dimensional data blocks;
- each data block DB is made of a plurality of chunks of at least 4 modules each, and includes a two-dimensional alignment pattern AP comprising a first zone of light modules adjacent to a second zone of which modules have colors representative of the remaining colors of the color palette;
- a barcode element BE comprises a corresponding barcode element error-correcting code BE-ECC and a locator BE-L including a barcode element orientation pattern BE-LOP;
- each locator BE-L of a barcode element BE further includes encoded locator data LD comprising decoding data for decoding said barcode element BE; and
- in case the two-dimensional barcode comprises a plurality of barcode elements, respective locator data of each barcode element BE further indicate a corresponding identification number of said barcode element.

Error-correcting codes (ECC) are generated by specific algorithms for detecting and correcting errors in data generally encoded into s-bit symbols (e.g. a byte or 8-bit symbol). Data are encoded into symbols (data words, e.g. bytes) with additional redundant information in a form of an ECC (to result in codewords). In case of block encoding, the symbols are encoded by blocks of k s-bit symbols. The redundancy allows a decoder to detect and correct a limited number of errors that may occur anywhere in the encoded data. Typically, the parameters of an error-correcting code ECC specify a length of a codeword, i.e. the number n of symbols in a codeword, and a number k of data symbols used to make a codeword. For example, in a Reed-Solomon encoder (as an example of block coding ECC) encoding original s-bit symbols into codewords of n symbols, the binary original data to be encoded is divided into blocks of k s-bit symbols, and (n–k) parity s-bit symbols (redundancy) are added to make an n symbols codeword. In this example of a Reed-Solomon error-correcting code RS (n, k), it is possible to correct up to t s-bit symbols containing errors, with $2t=(n-k)$. A level of error correction of encoded data with an error-correcting code is the percentage of the total number of s-bit symbols that are used for correcting errors, the remaining part indicating the percentage of the total number of s-bit symbols that can be used for effectively encoding original data. Preferably, this percentage is specified with only two bits (to save space) corresponding to numbers indicating, for example, four possibilities: 0 (no correction), 1 (level of correction 15%), 2 (30%) and 3 (45%). Once a gross capacity (in bits) of the two-dimensional barcode element BE is known (e.g. by knowing the number of its data blocks of given capacity, or the size of the BE and the number of colors if the all the data blocks have a same known size), an optimal size of the codewords (i.e. number n of symbols, including k added symbols for (n–k) parity symbols) of the RS is calculated, knowing that a maximal bit capacity for a RS with codewords of length n is given by $(2^n-1) \times n$, and selecting the lowest value of n permitting to encode the gross capacity of the two-dimensional barcode in bits. Once n is calculated, a gross number of codewords that the two-dimensional barcode element can contain is obtained by dividing said gross capacity by the size of the codewords (in bits) of the RS. The obtained gross number of codewords is then multiplied by the level of error correction of the RS to obtain the total number of codewords that can used for correcting: a difference between the gross number of codewords and the number of codewords that can be used for correcting then gives the number of codewords that are available for encoding a data payload. The total number of error correction codewords is thus the difference between the gross number of codewords and the number of codewords that are available for encoding a data payload. As a remark, in case of a Reed-Solomon error-correcting code, a limit for the level of correction is 66% (i.e. to correct one symbol of data, two correction symbols are necessary). In case the two-dimensional barcode comprises a plurality of barcode elements, the number of barcode elements may be specified in the locator data of the barcode elements, or may be specified in the barcode elements themselves (to save space), or may be included in the identification numbers of the barcode elements. A size of a barcode element, a data block, a chunk or an alignment pattern is generally expressed in terms of modules (e.g. a BE of 144×144 modules).

The decoding data for decoding a barcode element BE encoded in the locator data LD of its locator BE-L in fact include data relating to the structure of the barcode element in terms of its data blocks, chunks, alignment patterns and color palette, together with parameters of its barcode element error-correcting code BE-ECC, that are necessary for decoding the barcode element with a decoder. Moreover, in case there are a plurality of barcode elements in the two-dimensional barcode, the locator data LD of a locator L of a barcode element BE further includes an identification number of this barcode element, so that the decoder can appropriately assemble the decoded data from the various barcode elements to fully decode the two-dimensional barcode. Depending on prior data already known to the decoder regarding the structure of the two-dimensional barcode to be decoded, the symbols used for encoding data with its modules, the number of colors in the color palette, and/or a type of the barcode element error-correcting code, the locator data LD may only include additional data needed by the decoder for completing the decoding of the two-dimensional barcode. For example, in case the structure of a barcode element in terms of its size, a size of the data blocks, a size of the chunks and a size of the alignment pattern, the symbols used for encoding data (e.g. bytes) is known to the decoder but neither the number of colors of the color palette nor the type of the error-correcting code of the barcode element, the locator data will contain the number of colors in the color palette and parameters of the error-correcting code (e.g. for a RS code, the above mentioned parameters n, k and a level of error-correction). In case there are known (documented) versions of the structure and error-correction of a two-dimensional barcode that are stored in a decoder, then it suffices that the locator data of a barcode element of the two-dimensional barcode indicate an identifying number of its version. This situation is similar to that of existing standards (versions) for known barcodes like, for example, the QR code with its ISO/IEC 18004 standard (see the ISO/IEC 18004:2000 (E) published on 2000 Jun. 15, particularly section 13, steps 7 and 10).

In the above two-dimensional barcode, a chunk CK of a data block DB may further comprise a corresponding chunk error-detecting code CK-EDC. In fact, the chunk CK contains specific encoded parameter data corresponding to the error-detecting code that can be used by a reader programmed for detecting an error according to said error-detecting code parameter data when reading the chunk CK. An error-detecting code (also true for an error-correcting code) adds some redundancy (extra data) to original data (data words) that must be encoded in the chunk CK, then the original data together with the redundancy are encoded in the chunk and marked on the substrate. When a reader device reads the parameter data of the error-detecting code in the chunk CK of the data block DB, the redundancy bits encoded in the data chunk are then used to check consistency of the remaining data encoded in the chunk, and to locate data that has been determined to be corrupted (i.e. when the check fails). Error detection is most commonly performed by using a specific algorithm that adds a fixed-length "tag" to a block of bits (i.e. data word corresponding to encoded data in the data block DB) to form corresponding codeword (i.e. data word+tag), which enables a reader device to verify the read block of bits by recomputing a corresponding tag (according to the error-detecting code) and comparing it with the tag read with the block of bits.

For example, said error-detecting code may use simple well known error detection techniques like parity check or checksum. Preferably, the error-detecting code uses the error detection technique of Cyclic Redundancy Check ("CRC"). Thus, when reading the chunk CK of the data block DB on the two-dimensional barcode marked on an object with a reading/decoding apparatus, the read parameter data of the chunk error-detecting code CRC are used by the apparatus for detecting an error in the acquired data. Typically, the CRC parameter data comprise the number of bits of the CRC (i.e. the check value in the codewords) and the generator polynomial used for data verification. In case a size of the chunk CK is sufficient, it is also possible to use a code, e.g. like a Hamming code, that is useful for both detection and correction of an error present in the data acquired by the reading/decoding apparatus. A Hamming code is a well-known block code that is capable of detecting up to two simultaneous bit errors and correcting single-bit errors in a data stream.

Preferably, in the above two-dimensional barcode, a data block DB may further include a corresponding data block error-detecting code DB-EDC. In a preferred mode, the data block may correcting code DB-ECC that further include error is configured, i.e. adapted to a size of the data encoded in the data block DB. In fact, the data block DB contains specific encoded configuration data corresponding to the data block error-correcting code that can be used by a reader having a decoder programmed for correcting an error in data extracted from the data block DB by said reader according to a scheme corresponding to the (configured) data block error-correcting code. For example, said programmed data block error-correcting code may be a Reed-Solomon code. An advantage provided by of a configurable error-correcting code is that a size of the extra bits (redundancy) added according to said error-correcting scheme can be adjusted, according to the configuration data, to a size of the original data that must be encoded in the data block.

Possibly, the above two-dimensional barcode may further comprise a corresponding barcode error-correcting code B-ECC. In this case, if the two-dimensional barcode contains a plurality of barcode elements, the identification numbers of the barcode elements are included in the respective barcode element locator data (in order to be able to perform the correction with the B-ECC). The two-dimensional barcode in fact contains specific encoded parameter data corresponding to this barcode error-correcting code that can be used by a reader having a decoder programmed for correcting an error in data extracted from the two-dimensional barcode by said reader according to a scheme corresponding to the barcode error-correcting code (this one may be a RS code, for example). Preferably, the two-dimensional barcode error-correcting code is configured in view of a size of the data to be encoded in said two-dimensional barcode. Moreover, the two-dimensional barcode may further include a barcode error-detecting code B-EDC. An advantage provided by the barcode error-detecting code B-EDC, in addition to facilitate the correction of errors (as errors are first quickly detected) it allows to reduce a bit size of the barcode error-correcting code B-ECC as well as respective bit sizes of the barcode element error correcting code(s) BE-ECC and the data block error-correcting codes.

Preferably, in the above two-dimensional barcode, each two-dimensional alignment pattern AP comprises a central part corresponding to the first zone, in which a color of each module is light, surrounded by a contour of which modules have colors representative of the remaining colors of the color palette corresponding to the second zone. For example, each barcode element BE of the above two-dimensional barcode may have a rectangular shape and may comprise at least two locators disposed at two distinct corners of said barcode element BE, and a shape of the contour of the central part of the alignment pattern AP may be a square, to facilitate the operations of alignment of the data blocks in each barcode element at imaging and decoding stage of the two-dimensional barcode.

Preferably, the orientation pattern of a locator BE-L has a center mark CM of which modules have a same color that is surrounded by a two-dimensional contour C of modules having the same color as that of the center mark CM, said contour C being separated from the center mark CM by a layer of modules having a same color that is distinct from the color of the center mark CM, and locator data LD of the locator BE-L are encoded into modules disposed around the contour C, the orientation pattern further comprises at least one additional mark M including dark modules and disposed outside the contour C of the center mark CM. For example, the contour C may be circular. Preferably, the additional mark M of the orientation pattern of the locator BE-L comprises three, and preferably four, rings of dark modules surrounding a central part of light modules that are disposed outside the contour C and adjacent to it.

A second aspect of the invention relates to a method of encoding data into a two-dimensional barcode (as specified above) to be marked on a substrate, comprising the steps of:
encoding said data into at least one barcode element BE made up of elementary two-dimensional modules, a color of a module being selected from a color palette of a plurality of distinct reference colors including dark and light, wherein encoded data of each barcode element BE are split into a plurality of two-dimensional data blocks, each data block DB comprising a plurality of chunks of at least 4 modules each, and including a two-dimensional alignment pattern AP comprising a first zone of light modules adjacent to a second zone of which modules have colors representative of the remaining colors of the color palette;

including in each barcode element BE a corresponding barcode element error-correcting code BE-ECC and a locator BE-L comprising a barcode element orientation pattern, each locator BE-L of a barcode element BE further including encoded locator data LD comprising decoding data for decoding said barcode element; and in case the two-dimensional barcode comprises a plurality of barcode elements, further including in respective locator data of each barcode element BE a corresponding identification number of said barcode element.

In the above method of encoding data into the two-dimensional barcode, a chunk CK of a data block DB may further comprise a corresponding chunk error-detecting code CK-EDC. Also, a data block DB may further comprise a corresponding data block error-detecting code DB-EDC, and may further comprise a corresponding (configured) data block error-correcting code DB-ECC. Preferably, the two-dimensional barcode may further comprise a corresponding barcode error-detecting code B-EDC, and more preferably also a corresponding (configured) barcode error-correcting code B-ECC.

Preferably, in said method of encoding data into the two-dimensional barcode, an orientation pattern of a locator BE-L has a center mark CM of which modules have a same color that is surrounded by a two-dimensional contour C of modules having the same color as that of the center mark CM, said contour C being separated from the center mark CM by a layer of modules having a same color that is distinct from the color of the center mark CM, and locator data LD of the locator BE-L are encoded into modules disposed around the contour C, the orientation pattern further comprises at least one additional mark M including dark modules and disposed outside the contour C of the center mark CM. More preferably, the contour C is circular and the additional mark M of the orientation pattern of the locator BE-L comprises at least three (and preferably four) rings of dark modules surrounding a central part of light modules that are disposed outside the contour C and adjacent to it. Indeed, with only two rings it is possible to obtain both the scale and the orientation of the locator, but not the correction of perspective. Moreover, each two-dimensional alignment pattern AP may comprise a central part corresponding to the first zone, in which a color of each module is light, surrounded by a contour of which modules have colors representative of the remaining colors of the color palette corresponding to the second zone.

A third aspect of the invention relates to a system for encoding data into a two-dimensional barcode B and marking the two-dimensional barcode on a substrate, comprising a marking device, a processor equipped with a memory, a communication unit adapted to receive data and send data to the marking device through a communication link, wherein:

the communication unit is adapted to receive primary data to be encoded and store the received primary data in the memory;

the processor is adapted to encode and format the received primary data into at least one barcode element BE made up of elementary two-dimensional modules, a color a module being selected from a color palette of a plurality of distinct reference colors including dark and light, wherein encoded data of each barcode element BE are split into a plurality of two-dimensional data blocks, each data block DB comprising a plurality of chunks of at least 4 modules each, and each data block DB including a two-dimensional alignment pattern AP comprising a first zone of light modules adjacent to a second zone of which modules are representative of the remaining colors of the color palette;

configure for each barcode element BE a corresponding barcode error-correcting code BE-ECC and include each configured barcode element error-correcting code into its barcode element;

include in a barcode element BE a locator BE-L comprising a barcode element orientation pattern, each locator BE-L of a barcode element BE being formatted to include encoded locator data LD comprising decoding data for decoding said barcode element;

in case the two-dimensional barcode comprises a plurality of barcode elements, further include in respective locator data of each barcode element BE a corresponding identification number of said barcode element; and send the obtained two-dimensional barcode encoded data together with formatting data to the marking device via the communication unit;

the marking device is adapted to mark on the substrate the received encoded data according to the received formatting data with an arrangement of modules corresponding to said at least one barcode element BE comprising said two-dimensional data blocks, chunks, two-dimensional alignment patterns, barcode element error-correcting code BE-ECC and locator BE-L.

Particularly, in said above system for encoding and marking data, each two-dimensional alignment pattern AP may comprise a central part corresponding to the first zone, in which a color of each module is light, surrounded by a contour of which modules have colors representative of the remaining colors of the color palette corresponding to the second zone. Each barcode element BE of the two-dimensional barcode may have a rectangular shape and may comprise at least two locators disposed at two distinct corners of said barcode element BE, and a shape of the contour of the central part of the alignment pattern AP may be a square, to facilitate the operations of alignment of the data blocks in each barcode element at imaging and decoding stage of the two-dimensional barcode.

In a preferred embodiment of the above system for encoding and marking data:

the orientation pattern of a locator BE-L is formatted to have a center mark CM of which modules have a same color that is surrounded by a two-dimensional contour C of modules having the same color as that of the center mark CM, said contour C being separated from the center mark CM by a layer of modules having a same color that is distinct from the color of the center mark CM, and locator data LD of the locator BE-L are formatted to be encoded into modules disposed around the contour C, the orientation pattern is further formatted to comprise at least one additional mark M including dark modules and disposed outside the contour C of the center mark CM. For example, the contour C may be circular. Preferably, the additional mark M of the orientation pattern of the locator BE-L comprises three, and preferably four, rings of dark modules surrounding a central part of light modules that are disposed outside the contour C and adjacent to it.

Moreover, each two-dimensional alignment pattern AP may be formatted to comprise a central part corresponding to the first zone, in which a color of each module is light, surrounded by a contour of which modules have colors representative of the remaining colors of the color palette corresponding to the second zone.

The above system for encoding and marking data according to the invention may further have the processing unit adapted to include in a chunk CK of a data block DB a corresponding chunk error-detecting code CK-EDC. The processing unit may further be adapted to configure a data block error-detecting code DB-EDC, and possibly an error-correcting code DB-ECC, of a corresponding data block DB and include said configured data block error-detecting code DB-EDC, or said error-correcting code DB-ECC, in the data block DB.

Moreover, in the above system for encoding and marking data the processing unit may further be adapted to include in the two-dimensional barcode a corresponding barcode error-detecting code B-EDC and/or a corresponding (configured) barcode error-correcting code B-ECC.

According to a fourth aspect, the invention further relates to a system for imaging and decoding the above two-dimensional barcode marked on a substrate, comprising a camera equipped with a processing unit and a storage unit storing the reference colors of the color palette, the processing unit being adapted to perform image processing of a digital image of the illuminated two-dimensional barcode taken by the camera and stored in the storage unit, and decoding operations on said digital image, wherein, for each barcode element of the two-dimensional barcode, the camera is adapted to perform the following operations:

(A) detect, via image processing of the digital image with the processing unit, a locator BE-L and its orientation pattern of a barcode element BE on the stored digital image;

(B) estimate a local orientation of the barcode element BE within the digital image, and correct local image distortion of the locator BE-L, with the detected barcode element orientation pattern of said barcode element BE;

(C) extract and decode corresponding encoded locator data LD on the corrected digital image of the locator BE-L of the barcode element BE;

(D) based on the decoded locator data LD and image processing of the digital image via the processing unit, detect each alignment pattern AP on the digital image of the barcode element BE, and detect a position of each corresponding data block DB;

(E) for each detected data block DB of the barcode element BE, use its detected alignment pattern AP to correct image distortion of the data block to obtain a distortion-free data block image, to detect colors of the modules on the distortion-free digital image of the respective chunks of said data block DB, by detecting in said alignment pattern AP light modules in its first zone and colored modules in its second zone to obtain a detected color palette, and compensating illumination gradients on the digital image of the modules of the chunks of the data block DB by comparing a detected color of a module with the detected color palette and assigning to said module the closest color from the detected color palette;

(F) based on the decoded locator data LD of the locator BE-L and the determined colors of the modules of the chunks of the data blocks of the barcode element BE, decode encoded data of the chunks of the data blocks of the barcode element BE and correct corresponding decoded data with the barcode element error-correcting code BE-ECC of the barcode element BE to obtain corresponding corrected decoded barcode element data of the two-dimensional barcode; and (G) in case the two-dimensional barcode comprises a single barcode element, the corrected decoded barcode element data obtained in (F) corresponds to the obtained corrected decoded two-dimensional barcode data, and in case the two-dimensional barcode comprises a plurality of barcode elements, the processing unit of the camera is further adapted to use the decoded barcode element identification number from the decoded locator data of each barcode element, and assemble the respective corrected decoded barcode element data of the plurality of barcode elements of the two-dimensional barcode according to an ordering corresponding to the decoded identification numbers to obtain corresponding corrected decoded two-dimensional barcode data. The system may comprise an illumination unit adapted to illuminate the two-dimensional barcode while the camera takes an image of said two-dimensional barcode, or, alternatively, the camera may use daylight illumination of the barcode to take an image of it.

In the above system for imaging and decoding a two-dimensional barcode of the invention wherein a chunk CK of a data block DB of a barcode element BE further comprises a corresponding chunk error-detecting code CK-EDC, the camera is adapted to, via image processing of the digital image with the processing unit, in operation (E):

further check with the error-detecting code CK-EDC of each chunk CK of the data block DB whether there is an error in a chunk CK, and in case there is an error in a chunk CK of the data block DB, modify a color of at least one module of said chunk CK by assigning to said at least one module the corresponding second closest color from the detected color palette of the alignment pattern AP of the data block DB;

select each modified chunk of the data block DB giving no error when checked with the corresponding chunk error-detecting code CK-EDC; and store in the memory each selected modified chunk.

Preferably, in the above system for imaging and decoding a two-dimensional barcode wherein a data block DB of a barcode element BE further includes a corresponding data block error-detecting code DB-EDC, the camera is adapted to, via image processing of the digital image with the processing unit in operation (E):

form all the possible combinations of selected modified chunks among all the stored selected modified chunks, check with the error-detecting code DB-EDC of the data block DB which combination is free of error, and replace in the data block DB the modified chunks with chunks corresponding to the selected error-free combination.

More preferably, in the above system for imaging and decoding a two-dimensional barcode wherein the data block DB of a barcode element further includes a corresponding data block error-correcting code DB-ECC adapted to also detect errors, the camera is adapted to, via image processing of the digital image with the processing unit, in operation (E):

form all the possible combinations of selected modified chunks among all the stored selected modified chunks, check with the error-correcting code DB-ECC of the data block DB which combination can be corrected, and replace in the data block DB the modified chunks with chunks corresponding to the corrected combination.

Even more preferably, in the above system for imaging and decoding a two-dimensional barcode wherein the two-dimensional barcode further comprises a barcode error detecting code B-EDC and a barcode error-correcting code B-ECC, the camera is further adapted to, via image processing of the digital image with the processing unit in operation (F):

further detect whether any error still occurs in said decoded data of each barcode element BE with the corresponding barcode error-detecting code B-EDC, and only in case an error is detected in a barcode element BE, correct the detected error with the barcode error-correcting code B-ECC of the two-dimensional barcode to obtain the corrected decoded barcode element data. In this case, it is even much better to only use a global CRC code for the two-dimensional barcode.

According to a fifth aspect, the invention also relates to a method of imaging and decoding a two-dimensional barcode of the invention marked on a substrate, comprising the steps of:

(I) taking a digital image of the illuminated two-dimensional barcode with a camera equipped with a processing unit and a storage unit storing the digital image, the processing unit being adapted to perform image processing of the stored digital image and decoding operations on said digital image, and detecting via image processing a locator BE-L and its orientation pattern of a barcode element BE on the stored digital image;

(II) estimating a local orientation of the barcode element BE within the digital image, and correcting local image distortion of the locator BE-L, with the detected barcode element orientation pattern of said barcode element BE;

(III) extracting and decoding corresponding encoded locator data LD on the corrected digital image of the locator BE-L of the barcode element BE with the processing unit;

(IV) based on the decoded locator data LD and image processing of the digital image via the processing unit, detecting each alignment pattern AP on the digital image of the barcode element BE, and detecting a position of each corresponding data block DB;

(V) for each detected data block DB of the barcode element BE, using its detected alignment pattern AP to correct image distortion of the data block to obtain a distortion-free data block image, and detect colors of the modules on the digital image of the respective chunks of said data block DB, by detecting in said alignment pattern AP light modules in its first zone and colored modules in its second zone to obtain a detected color palette, and compensating illumination gradients on the digital image of the modules of the chunks of the data block DB by comparing a detected color of a module with the detected color palette, and assigning to said module the closest color from the detected color;

(VI) based on the decoded locator data LD of the locator BE-L and the determined colors of the modules of the chunks of the data blocks of the barcode element BE, decoding encoded data of the chunks of the data blocks of the barcode element BE and correcting corresponding decoded data with the barcode element error-correcting code BE-ECC of the barcode element BE to obtain corresponding corrected decoded barcode element data of the two-dimensional barcode; and (VII) in case the two-dimensional barcode comprises a single barcode element, the corrected decoded barcode element data obtained in step (VI) corresponds to the obtained corrected decoded two-dimensional barcode data, and in case the two-dimensional barcode comprises a plurality of barcode elements, using the decoded barcode element identification number obtained from the decoded locator data barcode element, and assembling the respective of each corrected decoded barcode element data of the plurality of barcode elements of the two-dimensional barcode according to an ordering corresponding to the decoded identification numbers to obtain corresponding corrected decoded two-dimensional barcode data.

In the above method of imaging and decoding a two-dimensional barcode of the invention marked on a substrate, wherein a chunk CK of a data block DB of a barcode element BE further comprises a corresponding chunk error-detecting code CK-EDC, the camera may be adapted to, via image processing of the digital image with the processing unit at step (V), carry out the further steps of:

further check with the error-detecting code CK-EDC of each chunk CK of the data block DB whether there is an error in a chunk CK, and in case there is an error in a chunk CK of the data block DB, modify a color of at least one module of said chunk CK by assigning to said at least one module the corresponding second closest color from the detected color palette of the alignment pattern AP of the data block DB;

select each modified chunk of the data block DB giving no error when checked with the corresponding chunk error-detecting code CK-EDC; and store in the memory each selected modified chunk.

Preferably, in the above method for imaging and decoding a two-dimensional barcode wherein a data block DB of a barcode element BE further includes a corresponding data block error-detecting code DB-EDC, the camera may be adapted to, via image processing of the digital image with the processing unit at step (V), carry out the further steps of:

form all the possible combinations of selected modified chunks among all the stored selected modified chunks, check with the error-detecting code DB-EDC of the data block DB which combination is free of error, and replace in the data block DB the modified chunks with chunks corresponding to the selected error-free combination.

An advantage of having both the error-detection and the error-correction in a data block DB is to increase the capacity of correcting errors present in the data block DB. In this case, it is preferable to have a low-size error correcting code in the data block DB.

More preferably, in the above method for imaging and decoding a two-dimensional barcode wherein a data block DB of a barcode element BE further includes a corresponding data block error-correcting code DB-ECC adapted to also detect errors, the camera may be adapted to, via image processing of the digital image with the processing unit at step (V), carry out the further steps of:

checking with the error-detecting code CK-EDC of each chunk CK of which at least one module has been modified by assignment of a second closest color whether there is an error in such modified chunk, and storing in the memory each modified chunk CK free of error; and selecting each combination of possible distinct assignment of color of the modules of all the stored error-free modified chunks, checking with the error-correcting code of the data block DB which selected combination is free of error, and replacing in the data block DB the modified chunks with chunks corresponding to the selected error-free combination.

In the above method for imaging and decoding a two-dimensional barcode, wherein the two-dimensional barcode further includes a corresponding barcode error-detecting code B-EDC and a barcode error-correcting code B-ECC (which may be comprised in a single error-correcting code like a Reed-Solomon code for example), the camera may further be adapted to, via image processing of the digital image with the processing unit at step (VI), to carry out the further steps of:

detecting whether any error still occurs in said decoded data of each barcode element BE with the corresponding barcode error-detecting code B-EDC, and only in case an error is detected in a barcode element BE, correcting the detected error with the barcode error-correcting code B-ECC of the two-dimensional barcode to obtain the corrected decoded barcode element data.

The present invention will be described more fully hereinafter with reference to the accompanying drawings, in which prominent aspects and features of the invention are illustrated.

DETAILED DESCRIPTION

Figure 1A:
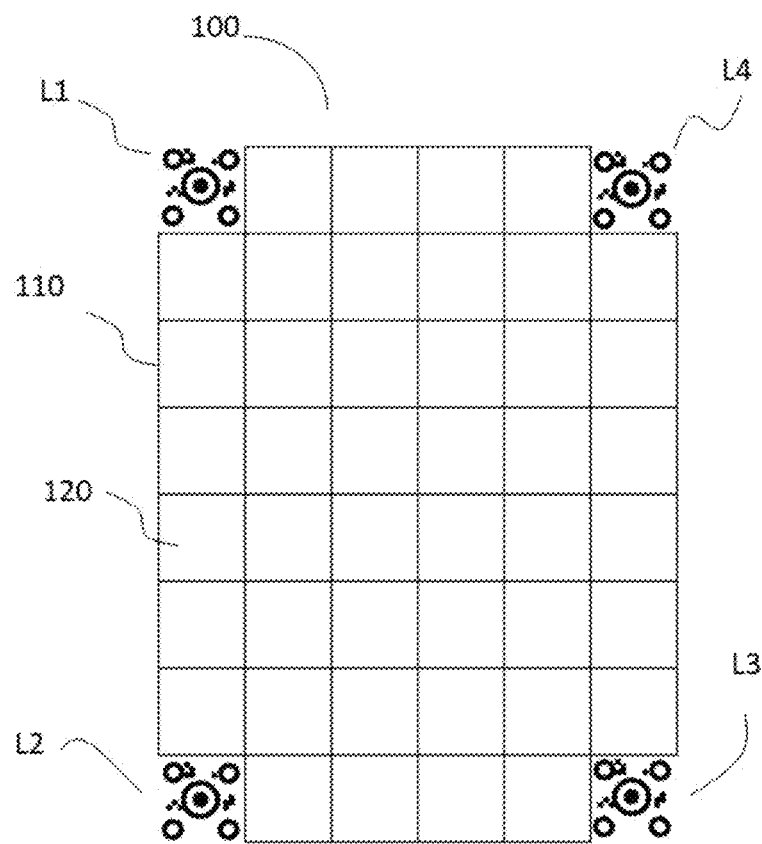
FIG. 1A-D illustrate an example of a two-dimensional barcode according to the invention and its components.

An illustrative embodiment of a two-dimensional barcode according to a first aspect of the invention is shown on FIG. 1A-D. The compact two-dimensional barcode (100) of FIG. 1A in fact comprises only one barcode element BE (110): the boundaries (here squares) of the data blocks DBs (120) forming the barcode element (110) are shown and form a grid. In this example, the barcode element (110) comprises four locators L1, L2, L3 and L4, respectively disposed at the four corners of the barcode element. In this example, the locators L1, L2, L3 and L4 have an identical geometrical aspect. Each locator L1 (i=1, . . . , 4) of a barcode element BE has a barcode element orientation pattern BE-LOP with a barcode element corresponding center mark CMi (i=1, . . . , 4) (112) made of dark modules (here forming a disc) surrounded by a corresponding contour Ci (i=1, . . . , 4) (113) made of dark modules (here forming a circle), with a layer (114) of light (white) modules between the center mark CMi and the contour Ci. In this example, as shown on FIG. 1D, the orientation patterns of the locators L1 (i=1, . . . , 4) also include four small additional marks, i.e. four rings (115) made of dark modules disposed at their four corners, of which respective central areas (116) are made of light (here white) modules. The barcode element (110) further comprises a (configured) barcode element error-correcting code BE-ECC that is encoded in one or several of its data blocks, depending on its level of error-correction and thus, of corresponding size of the BE-ECC parameter data. Each locator L1 (i=1, . . . , 4) includes encoded locator data LD indicating at least a size, here a width and a height (in modules), of said barcode element BE (110), a size of its data blocks (120), the number of colors of the corresponding color palette of the data blocks DBs of said barcode element BE (110), and a level of error-correction of said barcode element error-correcting code BE-ECC (from which parameters of the error-correcting code BE-ECC of the barcode element (110) can be derived). Of course, other data can be included in the locator (e.g. an identification number corresponding to each barcode element in case the two-dimensional barcode has several barcode elements etc.). The locator data LD are encoded with dark and light modules. In the example shown of FIG. 1A (see also FIG. 1D), the locator data LD of a locator L1 (i=1, . . . , 4) are disposed in the area of the locator that is comprised between the small circular rings (115) and the circular contour Ci (113).

In this embodiment, at least one chunk CK in each data block DB of the barcode element (110) includes an (encoded) chunk error-detecting code CK-EDC, preferably a CRC code. Moreover, each data block DB includes a corresponding data block error detecting code DB-EDC (preferably a CRC). Such a disposition of the error-detecting codes allows a robust, quick detection and location of errors in the data blocks at decoding stage.

A barcode element may comprise at least one locator having a center mark of any shape and surrounded by a contour of any shape. Moreover, the locators, or even their locator data, may not be all identical. Also, a shape of a data block DB is not necessarily a square. However, in the above preferred mode, the center mark CM and its contour C have a circular shape having the advantage of being invariant by rotation, so that a camera of reader that images the two-dimensional barcode (100) under a given viewing angle can easily detect the central mark CM and its contour C, via digital image processing on a processing unit of the reader, by checking that the pixels of the modules of the center mark CM (112) are darker than the pixels of the modules of the surrounding layer (114), and that the pixels of the modules of the surrounding layer (114) are lighter than the pixels of the contour C (113). Such a structure of the locator has the advantage of not necessitating any thresholding, but instead, using only relative binary comparisons of the intensities of neighboring pixels to precisely locate the orientation pattern (111) of a locator of the barcode element (110). The same is true for the detection of the four rings (115) of dark modules in sharp contrast with the light modules of their central areas (116). Moreover, the size of the center mark CM and the distances between the four rings (115) being known, it is easier to locate the four rings at the four corners of the locator and calculate image distortion at decoding stage. Also, the detected four rings (115) can be used to estimate an orientation of the barcode locator. Moreover, as there is a sharp contrast between the color of the modules forming both the center mark (112) and the contour (113), and the color of the modules forming the layer (114) comprised between the central mark and the contour, and knowing the orientation of the locator and the positions of the four rings (within a coordinate system of the digital image), the camera can easily compensate optical distortion so as to obtain a corrected image of the locator and its locator data (and thus, of its barcode element). The disposition of the identical locators at the four corners of the barcode element (110) allows for a quick and robust (due to the redundancy) determination of a location of the barcode element (110) in an image of the two-dimensional barcode (100) taken by the camera of the reader.

At decoding stage, wherein a structure of the data blocks in terms of chunks and alignment patterns is already known (with their sizes in modules) as well as the symbols used for encoding data (here 8-bit symbols, i.e. bytes) and the type of the barcode element error-correcting code BE-ECC (here a RS code), by using the obtained corrected image of a locator L, and the positions of its four rings, the processing unit of the reader can determine a sampling grid for decoding the locator data LD of the locator L, and then can decode the locator data LD and extract from the decoded locator data a size (height and width) of the corresponding barcode element (110), the number of colors (here, five) of the corresponding palette of colors of the modules of the data blocks, and a level of error correction of the barcode error-correcting code BE-ECC. In this example, such a level is of 30%. From the gross capacity of the barcode element (from the number of data blocks and the number of colors) and the extracted level of correction of 30%, the parameters of the barcode element error-correcting code can be derived for a given size of its codewords.

Figure 1B:
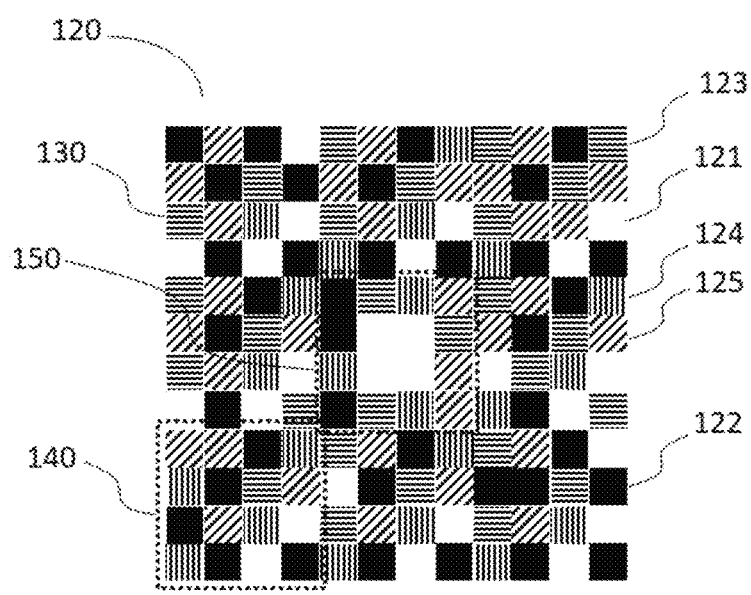
Figure 1C:
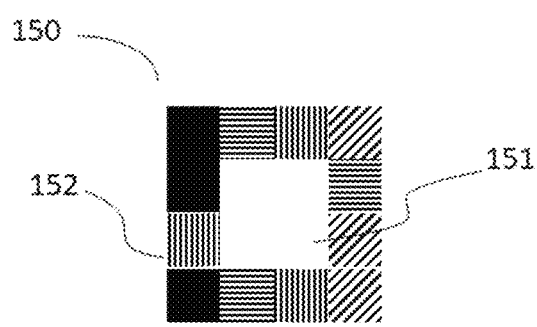
Figure 1D:
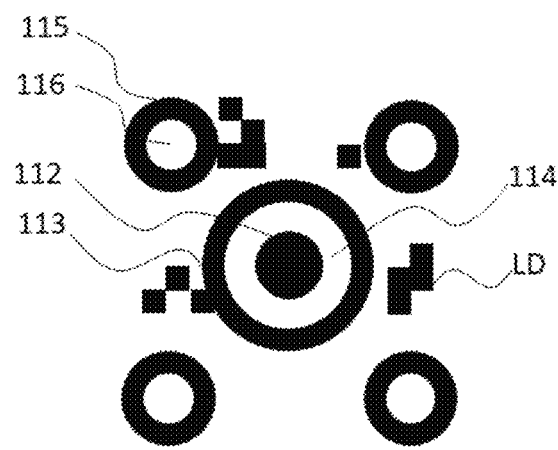

A detailed view of a data block DB (120) of the barcode element (110) is shown on FIG. 1B. In this example, the modules (130) of the data block (120) can have colors from a palette of five colors, i.e. white and the four colors of the CMYK color model (Cyan, Magenta, Yellow, Key). The different colors are represented, as detailed on FIG. 1B, as a white area (121) for a white (or light) module, a black area (122) for a dark module, and hatched areas (123, 124, 125) for, respectively, the Cyan, Magenta, and Yellow modules. This example with the CMYK color model is given due to its widespread use with printers capable to print such a barcode element on a substrate (e.g. paper sheet, label, security document, ID card etc.), however, many other well-known color models can be used instead (e.g. RGB "Red, Green, Blue", Lab, CMYKOG etc.).

A data block DB comprises a plurality of two-dimensional chunks CKs and a two-dimensional alignment pattern AP. In the example shown on FIG. 1B, each chunk CK (140) is made of a block of 4×4 modules (here, the shape of a chunk is a square), and the data block DB (120) has (3×3)−1=8 chunks disposed around the alignment pattern AP (150). The overall shape of the data block (120) is here a square, but other shapes are of course possible with a different disposition of the chunks and/or the alignment pattern. In this example, the alignment pattern (150) is disposed at the center of the data block (120), however other dispositions are possible (i.e. with off-center position). The alignment pattern (150), as detailed on FIG. 1C, here comprises a central part (151) with four light modules and a (square) boundary (152) made of a layer of one-module width of which module colors are representative of the rest of the color palette (here, CMYK). The shape of an alignment pattern is quite arbitrary, here it is a square of the size of one chunk but it could be, for example, a rectangle of a size of two (square) chunks (in this case, the data block DB would comprise less space for encoding data). Preferably, all the alignment patterns of the barcode element BE are identical and have the same disposition within the different data blocks of BE. When a camera of a reader takes a digital image the two-dimensional barcode and a processing unit of the reader analyzes this digital image to decode the encoded data, the role of the alignment pattern AP in each data block DB is to facilitate the detection and the ordered lecture of the various data blocks while allowing the processing unit to detect and correct possible variations of illumination conditions over the surface of the two-dimensional barcode (100), like a presence of (local) illumination light intensity gradients. Indeed, the colors of the modules of the alignment pattern, representative of the allowable full color palette, are used by the processing unit, together with the number of colors of the color palette extracted from the locator data, to locally (i.e. here on each data block) check a presence of any illumination light intensity gradient, or color variation, on the barcode and compensate for it (by comparing a detected color of each module of a data block with the detected color palette of the AP of the data block, and assigning to the module the closest color among the colors of the detected color palette of the AP), in order to correctly identify the colors of the modules and thus perform a reliable decoding of the data blocks.

Preferably, each data block DB of the bar code element (110) further contains a "configurable" data block error-correcting code DB-ECC (e.g. a Reed-Solomon code), i.e. an error-correcting code of which parameter data (relating to the size of added redundancy) is adapted to the size (i.e. number of bits) of the original data encoded in the data block DB. This locally (i.e. for each data block) configurability allows a better optimization of the data content, via flexible allocation of data, of the full two-dimensional barcode (100). As a result, at decoding stage, possible errors in the encoded data of the data blocks of barcode element BE are reliably quickly detected and corrected.

For example, a barcode element (110) of FIG. 1A as described above with four locators (each of a size of one data block), comprises (6×8)−4=44 data blocks having each 8 chunks of 4×4 modules (i.e. 128 modules) and one alignment patter AP of a size of one chunk, i.e. 1×(4×4)=16 modules, with a palette of five colors (i.e. white and CMYK). In this example, each chunk CK has an error-detecting code CK-EDC that is a conventional CRC ("Cyclic Redundancy Code") of 5 bits. A chunk having a capacity of 37 bits (i.e. trunc (16 modules×Ln(number of colors)/Ln (2)), with the CRC of 5 bits it remains 37−5=32 bits for encoding data. Each data block DB has a data block error-detecting code DB-EDC that is also a conventional CRC. In case the data blocks further include an error-correcting code DB-ECC, for example a Reed-Solomon, with a data block DB having 144 modules and 128 modules for encoding data, and with 32 bits per chunk for encoding data there are 32×8=256 bits=32 bytes per data block DB, and thus 44×256=11264 bits per barcode element. For a level of error correction of 308, with symbols of 8 bits (i.e. one byte) and a RS code of the data blocks with codeword length n of 11 bits, the maximal number of codewords in the BE is ($2^{11}$−1)=2047 that allow encoding the 11264/11=1024 codewords of the BE. Then 30% of the 1024 codewords give 307 codewords for the RS, remaining 717 codewords for encoding the payload data.

Figure 2:
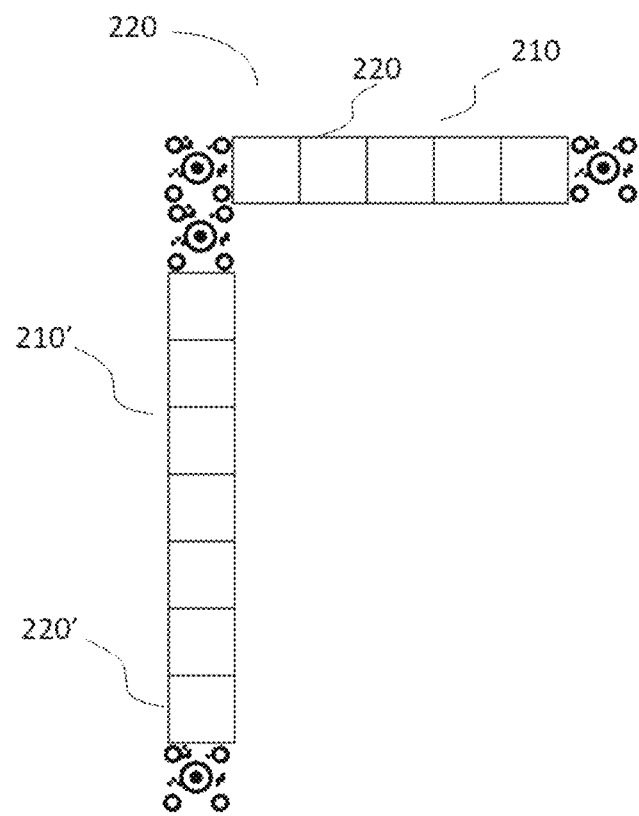
FIG. 2 illustrate an example of arrangement of the two barcode elements of a two-dimensional barcode of the invention.
Figure 3:
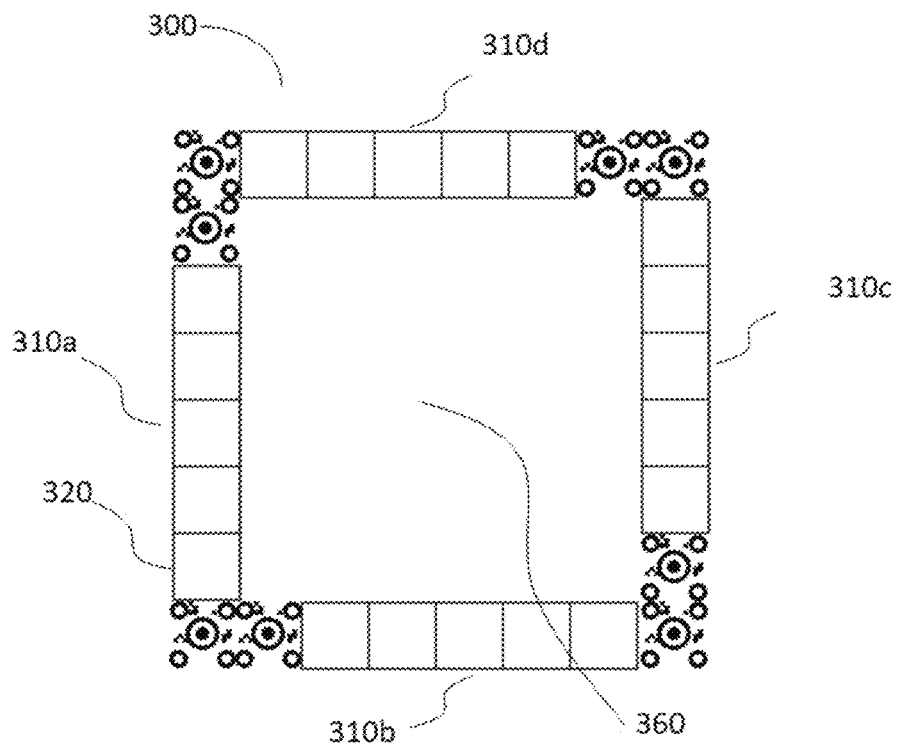
FIG. 3 illustrates another example of arrangement of the four barcode elements of a two-dimensional barcode of the invention.

The structure of a two-dimensional barcode according to the invention is very flexible. Indeed, in case the two-dimensional barcode comprises a plurality of barcode elements, the various barcode elements of the two-dimensional barcode can be disposed on a substrate independently at different locations, the locator data LD of each barcode element BE contains a corresponding identification number. Thus, when reading any barcode element of the two-dimensional barcode, a reader can retrieve its identification number (by decoding its locator data) and perform the decoding of the whole barcode elements by concatenating the respective decoded data according to the right order corresponding to the series of the identification numbers. This flexibility is illustrated with examples shown on FIG. 2-3. In FIG. 2, the two-dimensional barcode (200) comprises two linear (rectangular) barcode elements (210, 210') disposed at right angle, each barcode having two locators, one at each end, respectively (L1, L2) and (L1', L2'): the barcode element (210) comprises five data blocks (220), and the barcode element (210') comprises seven data blocks (220'). In this example, all the data blocks have a same size of 8 chunks together with one alignment pattern of a size of a chunk, each chunk comprising four modules, with colors belonging to a palette of five colors (i.e. white, and CMYK). Each data block (220, 220') includes one (central) alignment pattern of a size of one chunk. Another structure is shown on FIG. 3, with a two-dimensional barcode (300) comprising four linear barcode elements (310a, 310b, 310c, 310d) of same size disposed at right angles to form a square frame, each barcode having two locators, one at each end. Each barcode element (310a-310d)) comprise five data blocks (320). In this example, all the data blocks comprise 8 chunks of 4×4 modules, with colors belonging to a palette of five colors (i.e. white, and CMYK). Each data block includes one (central) alignment pattern. This example of configuration of a two-dimensional barcode may be used, for example, for encoding data disposed within the square area (360), i.e. central part data, surrounded by the four barcode elements. These data may be, for example, textual information or a photograph, or both: this case is particularly useful for secured identity documents, e.g. a passport, wherein the text relates to identification information of a person (e.g. name, birth date etc.), and the color photograph is an identity photo of that very person. The central part data (360) (text and photo) can then be checked visually by an agent and compared to the corresponding encoded data once decoded with an appropriate reader: in case there is no matching, the holder of the document does not correspond to the true owner of the document.

Figure 4:
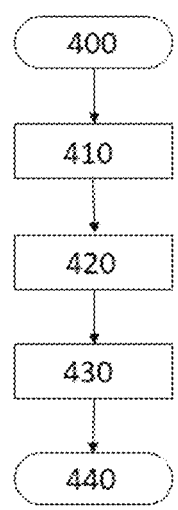
FIG. 4 is a flowchart illustrating an example of the method of encoding data into a two-dimensional barcode of the invention.

A flowchart of an example of the method of encoding data into a two-dimensional barcode of the invention, comprising a plurality of rectangular barcode elements, is illustrated on FIG. 4. In this example the two-dimensional barcode is that of FIG. 1A. The design parameters of the encoder are those mentioned above, i.e. the two-dimensional barcode comprises the barcode element (110) with four locators (each of a size of one data block), 44 data blocks having each 8 chunks of 4×4 modules and one alignment patter AP of a size of one chunk, with a palette of five colors (i.e. white and CMYK). In this example, 8-bit symbols are used for encoding data and each chunk CK has a CRC of 5 bits. Each data block DB has a data block error-detecting code DB-EDC that is also a CRC. The barcode element error-correcting code BE-ECC is a Reed-Solomon (with codewords of 10 bits) and the level of error correction is of 30%. The locator data LD corresponds to these design parameters. Of course, a bit size of the data payload (i.e. the primary data) to be encoded must be compatible with such a structure, i.e. with the capacity of the two-dimensional barcode (100). As shown of FIG. 4:

the method starts (400), then a data payload of original data to be encoded in the two-dimensional barcode is received;

(410) the encoded locator data is formatted to be disposed in the four locators L1, . . . , L4;

the following values are calculated:

the original data (data payload) is encoded (420), formatted and split into the data blocks of the barcode element BE, so that:

the barcode element BE is made up of elementary two-dimensional modules (a color of a module being selected from the five colors of the color palette);

encoded data of the barcode element BE are split into a corresponding plurality (i.e. 44) of two-dimensional data blocks DBs, each data block DB comprising a plurality (i.e. 8) of corresponding chunks CKs, and including one two-dimensional alignment pattern AP (see FIGS. 1B-C) and a corresponding data block error-detecting code CRC, wherein a chunk CK of a data block DB comprises its corresponding error-detecting code CRC. Each two-dimensional alignment pattern AP comprising a first zone of light (white) modules adjacent to a second zone of which modules have colors representative of the remaining colors of the color palette (here, CMYK colors). In this example, AP data are formatted to provide a square alignment pattern AP comprising a (square) central part of white modules, corresponding to the first zone, surrounded by a (square) contour of colored modules, corresponding to the second zone (see FIG. 1C).

the method continues by formatting the encoded data of the two-dimensional barcode (430) to correspond to the above mentioned structure of the two-dimensional barcode and its components; and the method of encoding data into the two-dimensional barcode of the invention ends (440).

The encoded data of the two-dimensional barcode and the corresponding formatting data obtained as indicated above can be sent to a marking device which then can, accordingly, mark the two-dimensional barcode on a substrate.

Figure 5:
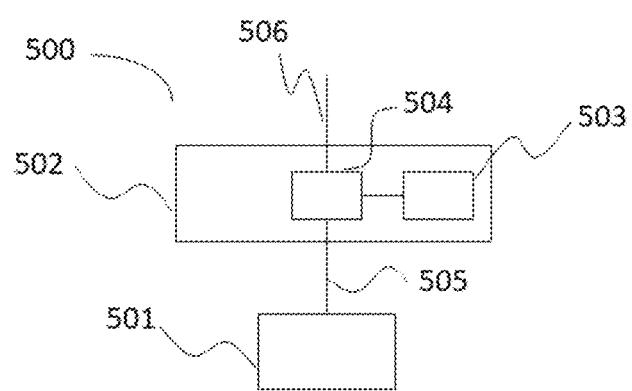
FIG. 5 Schematically illustrates an example of a m for encoding data into a two-dimensional barcode according to the invention and marking such barcode on a substrate.

An example of a system (500) for encoding data into a two-dimensional barcode having a plurality of barcode elements by implementing the steps of a method of encoding data according to the invention (e.g. the method of FIG. 4), and marking such two-dimensional barcode on a substrate is schematically illustrated on FIG. 5. The encoding-marking system (500) comprises a marking device (501), a processing unit (502) equipped with a memory (503), a communication unit (504) adapted to receive data and send data to the marking device (501) through a communication link (505). The communication unit (504) is adapted to receive primary data (506) (i.e. the above mentioned data payload of original data) to be encoded into the two-dimensional barcode, and store the received primary data (506) into the memory (503). The memory (503) further stores respective parameter values of a selected color palette for the modules (e.g. the above mentioned five colors: light plus CMYK), a number of modules in a chunk CK and in an alignment pattern AP (of which modules are representative of the selected color palette), a size of a locator L, a number of locators by barcode element BE, a size of a data block DB, a selected type of error-detecting code of a chunk (e.g. a 5-bit CRC), selected type of data block error-detecting codes DB-EDCs for the data blocks, selected type of barcode element error-correcting codes BE ECC for the barcode elements (e.g. RS code with 10-bit codewords) and its level or error correction, and a selected spatial disposition for the two-dimensional barcode and its components. The processing unit (502), according to the parameter values stored in the memory (503), calculates a number of data blocks DBs comprised in each barcode element and a number of (rectangular) barcode elements forming the two-dimensional barcode, and their respective width and height (in modules) to be included in the corresponding locator data LD of each locator L. The processing unit (502) is adapted to encode and format the received primary data (506) into the calculated number of respective rectangular barcode elements BEs to form a corresponding two-dimensional barcode made up of elementary two-dimensional modules (a color a module being selected from the selected color palette), by performing the operations of:

- splitting encoded data of each barcode element BE into the corresponding number of two-dimensional data blocks DBs, each data block DB comprising a calculated number of chunks CKs, each chunk including corresponding error-detecting code and each data block DB including a two-dimensional alignment pattern AP (e.g. as described above, see FIG. 1B-C);
- configuring and including into each barcode element BE a corresponding barcode error-correcting code BE-ECC (i.e. adding redundancy to the original binary data according to the calculated parameters of the error-correcting code and including the resulting codewords into the barcode element);
- including in each barcode element BE a locator BE-L with its orientation pattern, each locator BE-L of a barcode element BE being formatted to include encoded locator data LD indicating an identification number of said barcode element BE, the calculated width and a height of said barcode element BE, the number of colors of the corresponding palette of the data blocks of said barcode element BE, and a level of error correction of the error-correcting code BE-ECC of said barcode element BE;
- determining formatting data for the two-dimensional barcode corresponding to the above two-dimensional barcode encoded data and the selected spatial disposition for the components (i.e. respective barcode elements with their data blocks, chunks, alignment patterns, locators and orientation patterns) of the two-dimensional barcode to be marked on the substrate;
- sending the obtained two-dimensional barcode encoded data together with formatting data to the marking device (501) (e.g. a printer) via the communication unit (504) over the communication link (505); and
- marking on the substrate with the marking device (501) the received encoded data according to the received formatting data with an arrangement of modules corresponding to the selected spatial disposition of the calculated barcode elements BEs comprising the corresponding plurality of two-dimensional data blocks DBs, chunks CKs, two-dimensional alignment patterns APs, and locators BE-Ls.

For example, in case the marking device is a printer (e.g. the two-dimensional barcode is printed on labels to be glued on packets), the printer should be capable to print at least three pixels per module. Typically, with a printer at 600 dpi ("dots per inch"), with the minimum of 3 pixels per module, we arrive at a barcode at 200 dpi. For a printer at 720 dpi, with dot size of 35 μm, five points per module and printing with four colors, we arrive at a size of 212 μm per module (at 720 dpi, a pixel has a size of $1/720$ inch). In practice, for a printer at 600-720 dpi, we use 6 pixels per module.

An example of a flowchart (600) of a method of imaging and decoding an embodiment of a two-dimensional barcode of the invention, comprising a plurality of barcode elements, marked on a substrate. In this example, the two-dimensional barcode to be decoded is the same as on FIG. 1A, with one alignment pattern AP in each data block DB, the AP being that of FIG. 1C, it has only one rectangular barcode element BE (110) that comprises four square locators L1, ..., L4 disposed at the corners of the barcode element BE, with 44 square data blocks DBs comprised between these four locators and having all a same size. In this two-dimensional barcode (100), each square data block DB (of 144 modules) as a structure in terms of chunks (of 4×4 modules) similar to that of the data block (120) shown on FIG. 1B, and comprises one central alignment pattern AP (150) of 16 modules as shown on FIG. 1C (with central part (151) of four white modules and square boundary (152) of modules with colors from the 4 colors CMYK). All the alignment patterns of the data blocks are identical. Moreover, each locator L1 (i=1, ..., 4) has an orientation pattern with a center mark CMi made of black modules surrounded by a circular contour Ci of black modules, the contour Ci being separated from the center mark CMi by a layer of white modules, and locator data LD are encoded into modules disposed around the contour Ci. Each orientation pattern of a locator L1 has also an additional mark Mi (outside the contour Ci of the center mark CMi) made of four small black rings (as described above), each surrounding a disk of white modules. These four rings are respectively disposed at the four corners of the locator (see FIG. 1A). The circular contours Ci (i=1, ..., 4), being invariant by rotation, are particularly suited for detecting said contours when a camera images the locator, and the detected contours and corresponding center marks and rings are used (via conventional image processing) for compensating image distortion and estimating orientation of the locator to dispose an adequate sampling grid on the detected locator for detecting the modules of the locator and then decoding the corresponding locator data for the barcode element. Indeed, the sharp contrast between the center mark CMi (of black modules), the surrounding layer of white modules and the contour Ci of black modules (see FIG. 1A), makes easier a detection of the locator itself and its orientation when imaging the locator L1. In this particular example, one chunk CK of each data block DB includes an error-detecting code CK-EDC that is a CRC (however, other known error-detecting codes can be used instead), each data block DB further includes a data block error-detecting code DB-EDC (here, also a CRC, instead of a RS as in a data block of FIG. 1A), and the color palette comprises the conventional five colors CMYK and white.

Figure 6:
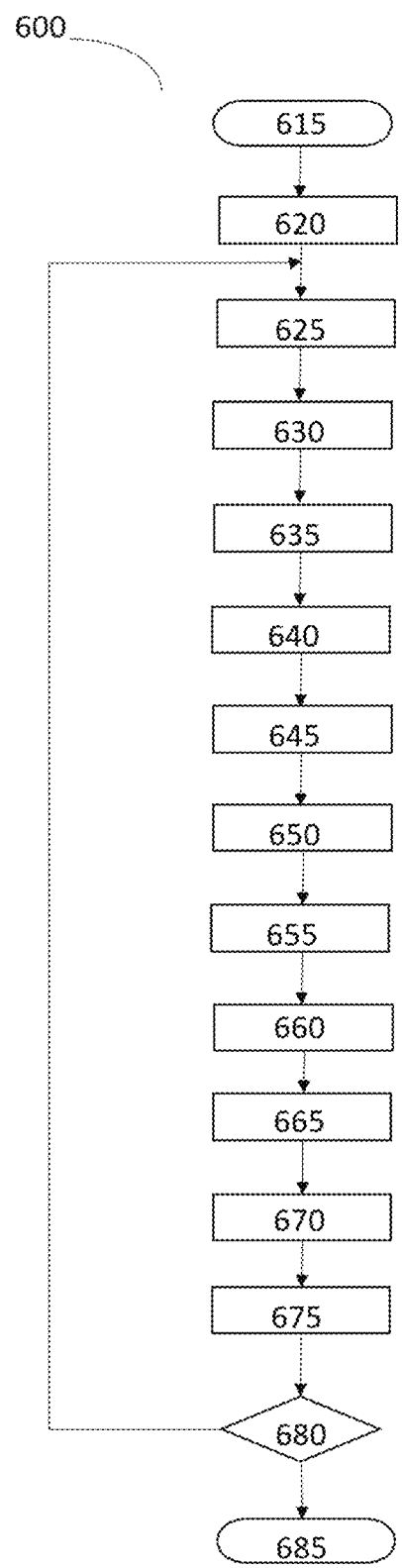
FIG. 6 is a flowchart illustrating an embodiment of a method of imaging and decoding a two-dimensional barcode marked on a substrate according to the invention.

The imaging and decoding method starts (615) and comprises the steps of (see FIG. 6):

- taking (620) a digital image of the illuminated two-dimensional barcode at a viewing angle with a camera equipped with RGB ("Red Green Blue") light sensors, a processing unit and a storage unit, and storing the digital image in the memory, the processing unit being adapted to perform image processing of the stored digital image of the 2D barcode and decoding operations on said digital image. Illumination of the two-dimensional barcode may result from mere daylight (if of sufficient intensity) or may be due to a specific illumination unit (e.g. a LED flash).
- detecting (625), via image processing of the digital image stored in the memory, a locator L1, by detecting its center mark CMi, contour Ci and additional mark Mi of the barcode element BE. This step is carried out by checking that the pixels of the center mark CMi are darker than the pixels of the surrounding layer, and that the pixels of the surrounding layer are lighter than the pixels of the contour Ci (such binary comparisons of the measured colors avoid a use of any thresholding). Once the center mark CMi and its contour Ci have been detected, the four rings forming the additional mark Mi of the orientation pattern are detected (outside a position of the detected contour of the center mark, and in the corners of the locator) by further checking, for each ring, that the pixels of the ring are darker than the pixels of the surrounded disk. The detected presence of the four rings validates the localization of the center mark. This operation may be repeated for the remaining locators of the barcode element.

estimating an orientation (630) of the barcode element BE within the digital image with the locator L1, based on the detected location of the orientation pattern. This operation may be further performed with the remaining locators of the barcode element to have a better reliability of the estimation.

detecting and compensating (635) an optical distortion of the image of the locator L1, based on the detected (relative) positions of the four rings of the additional mark Mi of the orientation pattern, to obtain a corrected (distortion-free) image of the locator L1. This operation may be repeated for the remaining locators of the barcode element.

determining (640) a sampling grid, and disposing the grid over the locator L1 to detect its modules, by using the (corrected) positions of the four rings on the corrected image of the locator.

detecting the modules (645) (and their white or dark color) disposed outside the contour Ci of the center mark CMi through the sampling grid, decoding the locator data LD encoded in said detected modules, and extracting a size of corresponding barcode element BE, a size of the data blocks DBs of said barcode element BE, the number of colors of the corresponding color palette of the modules of the data blocks DBs of said barcode element BE, a level of error correction of the error-correcting code BE-ECC of said barcode element BE. In case the two-dimensional barcode has a plurality of barcode elements having each a corresponding identification number, the corresponding identification number of the relevant barcode element BE is further extracted. The possibility of decoding the locator data also allows to eliminate any ambiguity of the estimated orientation of the barcode element. Indeed, with the four rings disposed at the corners of the square locator, there may be an error of 90° in the previously estimated orientation of the barcode element BE (in case such decoding is not possible, the step (630) is re-run with an estimated orientation incremented by 90° until the decoding can be performed).

based on the extracted decoded locator data LD of the barcode element BE and image processing of the digital image via the processing unit, gradually detecting (650) the two-dimensional alignment patterns APs of the respective data blocks DBs forming the barcode element BE corresponding to the detected locator L1 (in this example, the alignment patterns are all identical). From the orientation of the barcode element, the decoded sizes of the BE and the data blocks, the decoded number of colors of the modules (here, five colors: white and CMYK), a corresponding region of the corrected image is scanned (via image processing with the processing unit) in which the alignment patterns are searched step by step (e.g. starting from the locator and gradually moving off). In this example, a sum of the RGB components of the pixels of each module in the region is calculated, and then each alignment pattern is detected by checking that the RGB sum of the pixels of each module in the first zone of an alignment pattern is lighter than the RGB sum of the pixels of each module in the second zone, i.e. the modules of the contour surrounding the first zone. Once a candidate is detected for an alignment pattern, a verification that the candidate is indeed an alignment pattern is performed by checking that the modules of the first zone (i.e. central part of the AP, see FIG. 1B) are all white.

once all the alignment patterns of a barcode element have been detected, each alignment pattern AP of a data block is used to correct image distortion of the data block and provide a distortion-free image of the data block (the known square shape of the AP is used to detect the distortion of the image of the AP and the surrounding data blocks), thus compensating (655) local optical distortion of the data blocks of the barcode element to obtain a corrected (distortion-free) digital image of the barcode element. The (known) positions of the four detected alignment patterns of the four data blocks (or only three Aps together with the AP of the data block) surrounding a given data block are used for correcting local image distortion of said given data block.

determining a sampling grid (660) for each data block DB of the barcode element BE on the corrected digital image of the barcode element.

compensating (665) local illumination gradients on the corrected digital image of the barcode element. This compensation is carried out automatically, for each module of a data block, by comparing its color as detected trough the sampling grid on the corrected digital image of the barcode element with all the colors included in the (reference) color palette detected on the alignment pattern of the data block, and assigning the color of the color palette that is the closest to the detected color of the module (for example, by computing an Euclidean distance in the RGB color space between the detected color of the module and the respective colors of the detected color palette of the data block). This systematic local correction of the colors of the modules of a data block eliminates any influence of illumination gradients, and makes the identification of the colors of the modules very robust and reliable (and thus, will provide a more reliable decoding of the data block).

for each data block DB, checking (670) with the error-detecting code CK-EDC of each chunk CK of the data block DB whether there is an error in a chunk CK, and in case there is an error in a chunk CK of the data block DB, modifying a color of at least one module of said chunk CK by assigning to said at least one module the corresponding second closest color from the detected color palette of the alignment pattern AP of the data block DB, selecting each modified chunk of the data block DB giving no error when checked with the corresponding chunk error-detecting code CK-EDC, and storing in the memory each selected modified chunk.

for each data block DB, forming (675) all the possible combinations of selected modified chunks among all the selected modified chunks stored in the memory, checking with the error-detecting code DB-EDC (a CRC in this example) of the data block DB which combination is free of error, and replacing in the data block DB the modified chunks with chunks corresponding to the selected error-free combination. As a result, data blocks giving no error when checked with corresponding DB-EDCs are obtained for decoding. For example, in case there are three selected modified chunks of a data block DB, say CK1, CK2 and CK3, stored in the memory at step (675), the number of said possible combinations is obtained as: (number of distinct assignments of color in CK1 giving no error with the CK1–EDC)×(number of distinct assignments of color in CK2 giving no error with the CK2–EDC)× (number of distinct assignments of color in CK3 giving no error with the CK3–EDC).

decoding (680) encoded data of the chunks of the data blocks of the barcode element BE and correcting corresponding decoded data with the barcode element error-correcting code BE-ECC of the barcode element BE to obtain corresponding corrected decoded barcode element data of the two-dimensional barcode, thereby terminating (685) the imaging and decoding operations of the barcode element BE.

An advantage of having a data block error-detecting code DB-EDC in a data block DB is to reduce the size of the chunk error-detecting codes CK-EDC of the chunks of the data block so that there is more space available for payload data.

In case there is a plurality of barcode elements in the imaged two-dimensional barcode, the above operations comprises carrying out the steps (625) to (680) for each barcode element forming the two-dimensional barcode, and assembling the respective corrected decoded data of each barcode element of the two-dimensional barcode according to an ordering corresponding to the respective decoded identification numbers (at step 645) of said barcode elements to obtain corresponding corrected decoded data of the two-dimensional barcode, which terminates (685) the operations of the imaging and decoding method.

Figure 7:
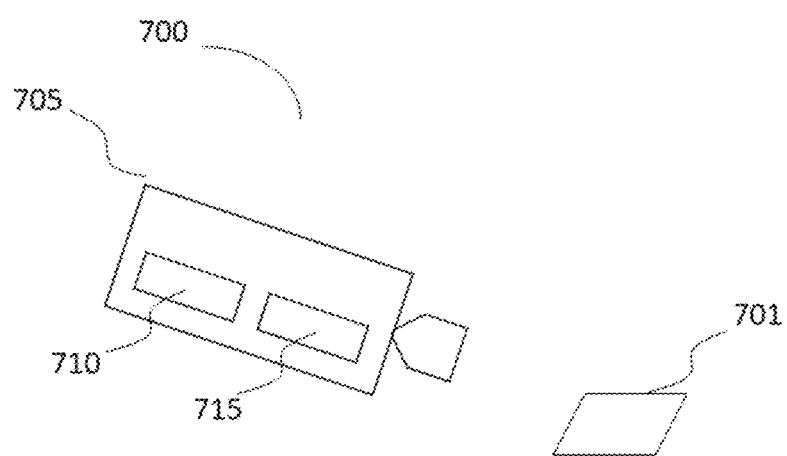
FIG. 7 schematically illustrates an embodiment of a system for decoding data encoded into a two-dimensional barcode according to the invention.

An example of a system (700) for imaging and decoding a two-dimensional barcode marked on a substrate according to the invention, adapted to implement the above embodiment of the imaging and decoding method, is illustrated on FIG. 7. In this example, the imaged two-dimensional barcode is the one illustrated on FIG. 1A with one barcode element BE wherein each data block DB has one alignment pattern AP (see FIG. 1B-C). The system comprises a camera (705) equipped with equipped with RGB light sensors, a processing unit (710) and a storage unit (715), the processing unit (710) being adapted to perform image processing of a digital image (715) of the illuminated two-dimensional barcode (701) taken by the camera (705) and stored in the storage unit (715), and decoding operations on said digital image (715). The camera (705) is adapted to detect via image processing with the processing unit (710) each one of the four locators L1 (i=1, . . . , 4) on the stored digital image (715) by carrying out the operations of steps (625) to (645) of the above imaging and decoding method (see also FIG. 6). The camera (705) is adapted to gradually detect via image processing with the processing unit (710) each one of the alignment patterns of the barcode element by performing the operations of step (650) of the above imaging and decoding method, and once all the alignment patterns of the barcode element have been detected, the processing unit (710) perform the operations of step (655) to compensate local optical distortion of the data blocks to obtain a corrected (i.e. distortion-free) digital image of the data blocks of the barcode element that is stored in the storage unit (715). The processing unit (710) then determines a sampling grid for each data block DB of the barcode element BE, and a sampling grid for the whole barcode element BE on the stored corrected digital image of the barcode element according to step (660). The processing unit (710) compensates local illumination gradients on the corrected digital image of the barcode element by using the sampling grid according to step (665) of the above method. As mentioned above, this compensation is carried out, for each module of a data block, by comparing with the processing unit (710) its color as detected trough the sampling grid on the corrected (distortion-free) digital image of the barcode element with all the five colors included in the reference color palette, and assigning the color of the reference palette that is the closest to the detected color of the module. Based on the assigned colors to the modules of each data block DB, the processing unit (710) performs the operations of steps (670) to (685) of the imaging and decoding method to successively obtain corrected decoded data of the all the data blocks of the barcode element, and thus obtain the corrected decoded data of the barcode element, i.e. the corrected decoded data of the two-dimensional barcode.

The above disclosed subject matter is to be considered illustrative, and not restrictive, and serves to provide a better understanding of the invention defined by the independent claims.

The invention claimed is:

1. A two-dimensional barcode B marked on a substrate comprising data encoded into at least one barcode element BE made up of elementary two-dimensional modules, a color of a module being selected from a color palette of a plurality of distinct reference colors including dark and light, wherein:
    encoded data of each barcode element BE are split into a plurality of two-dimensional data blocks;
    each data block DB is made of a plurality of chunks of at least 4 modules each, and includes a two-dimensional alignment pattern AP comprising a first zone of light modules adjacent to a second zone of which modules have colors representative of the remaining colors of the color palette;
    a barcode element BE comprises a corresponding barcode element error-correcting code BE-ECC and a locator BE-L including a barcode element orientation pattern BE-LOP;
    each locator BE-L of a barcode element BE further includes encoded locator data LD comprising decoding data for decoding said barcode element BE; and
    in case the two-dimensional barcode comprises a plurality of barcode elements, respective locator data of each barcode element BE further indicate a corresponding identification number of said barcode element.

2. The two-dimensional barcode of claim 1, wherein a chunk CK of a data block DB further comprises a corresponding chunk error-detecting code CK-EDC.

3. The two-dimensional barcode according to claim 1, wherein a data block DB further includes a corresponding data block error-detecting code DB-EDC.

4. The two-dimensional barcode of claim 3, wherein a data block DB further includes a corresponding data block error-correcting code DB-ECC.

5. The two-dimensional barcode according to claim 1, further comprising a corresponding barcode error-correcting code B-ECC.

6. The two-dimensional barcode according to claim 1, wherein
- each two-dimensional alignment pattern AP comprises a central part corresponding to the first zone, in which a color of each module is light, surrounded by a contour of which modules have colors representative of the remaining colors of the color palette corresponding to the second zone; and
- each orientation pattern of a locator BE-L has a center mark CM of which modules have a same color that is surrounded by a two-dimensional contour C of modules having the same color as that of the center mark CM, said contour C being separated from the center mark CM by a layer of modules having a same color that is distinct from the color of the center mark CM, and locator data LD of the locator BE-L are encoded into modules disposed around the contour C, the orientation pattern further comprises at least one additional mark M including dark modules and disposed outside the contour C of the center mark CM.

7. A system for imaging and decoding the two-dimensional barcode marked on a substrate according to claim 1 comprising a camera equipped with a processing unit and a storage unit storing the reference colors of the color palette, the processing unit being adapted to perform image processing of a digital image of the illuminated two-dimensional barcode taken by the camera and stored in the storage unit, and decoding operations on said digital image, wherein, for each barcode element of the two-dimensional barcode, the camera is adapted to perform the following operations:
- (A) detect, via image processing of the digital image with the processing unit, a locator BE-L and its orientation pattern of a barcode element BE on the stored digital image;
- (B) estimate a local orientation of the barcode element BE within the digital image, and correct local image distortion of the locator BE-L, with the detected barcode element orientation pattern of said barcode element BE;
- (C) extract and decode corresponding encoded locator data LD on the corrected digital image of the locator BE-L of the barcode element BE;
- (D) based on the decoded locator data LD and image processing of the digital image via the processing unit, detect each alignment pattern AP on the digital image of the barcode element BE, and detect a position of each corresponding data block DB;
- (E) for each detected data block DB of the barcode element BE, use its detected alignment pattern AP to correct image distortion of the data block to obtain a distortion-free data block image, and detect colors of the modules on the digital image of the respective chunks of said data block DB, by detecting in said alignment pattern AP light modules in its first zone and colored modules in its second zone to obtain a detected color palette, and compensating illumination gradients on the digital image of the modules of the chunks of the data block DB by comparing a detected color of a module with the detected color palette and assigning to said module the closest color from the detected color palette;
- (F) based on the decoded locator data LD of the locator BE-L and the determined colors of the modules of the chunks of the data blocks of the barcode element BE, decode encoded data of the chunks of the data blocks of the barcode element BE and correct corresponding decoded data with the barcode element error-correcting code BE-ECC of the barcode element BE to obtain corresponding corrected decoded barcode element data of the two-dimensional barcode; and
- (G) in case the two-dimensional barcode comprises a single barcode element, the corrected decoded barcode element data obtained in (F) corresponds to the obtained corrected decoded two-dimensional barcode data, and
  in case the two-dimensional barcode comprises a plurality of barcode elements, the processing unit of the camera is further adapted to use the decoded barcode element identification number from the decoded locator data of each barcode element, and assemble the respective corrected decoded barcode element data of the plurality of barcode elements of the two-dimensional barcode according to an ordering corresponding to the decoded identification numbers to obtain corresponding corrected decoded two-dimensional barcode data.

8. The system of claim 7, for imaging and decoding the two-dimensional barcode marked on a substrate wherein a chunk CK of a data block DB further comprises a corresponding chunk error-detecting code CK-EDC, and, wherein the camera is further adapted to, via image processing of the digital image with the processing unit, in operation (E):
- further check with the error-detecting code CK-EDC of each chunk CK of the data block DB whether there is an error in a chunk CK, and in case there is an error in a chunk CK of the data block DB, modify a color of at least one module of said chunk CK by assigning to said at least one module the corresponding second closest color from the detected color palette of the alignment pattern AP of the data block DB;
- select each modified chunk of the data block DB giving no error when checked with the corresponding chunk error-detecting code CK-EDC; and
- store in the memory each selected modified chunk.

9. The system of claim 8, for imaging and decoding the two-dimensional barcode marked on a substrate, wherein a chunk CK of a data block DB further comprises a corresponding chunk error-detecting code CK-EDC, wherein a data block DB further includes a corresponding data block error-detecting code DB-EDC, and wherein the camera is further adapted to, via image processing of the digital image with the processing unit, in operation (E):
- form all the possible combinations of selected modified chunks among all the stored selected modified chunks, check with the error-detecting code DB-EDC of the data block DB which combination is free of error, and replace in the data block DB the modified chunks with chunks corresponding to the selected error-free combination.

10. The system of claim 8, for imaging and decoding the two-dimensional barcode marked on a substrate, wherein a chunk CK of a data block DB further comprises a corresponding chunk error-detecting code CK-EDC, and, wherein each data block DB includes a corresponding data block error-correcting code DB-ECC adapted to also detect errors, and the camera is further adapted to, via image processing of the digital image with the processing unit, in operation (E):
- form all the possible combinations of selected modified chunks among all the stored selected modified chunks, check with the error-correcting code DB-ECC of the data block DB which combination can be corrected, and replace in the data block DB the modified chunks with chunks corresponding to the corrected combination.

11. A method of encoding data into a two-dimensional barcode to be marked on a substrate, comprising the steps of:
encoding said data into at least one barcode element BE made up of elementary two-dimensional modules, a color of a module being selected from a color palette of a plurality of distinct reference colors including dark and light, wherein encoded data of each barcode element BE are split into a plurality of two-dimensional data blocks, each data block DB comprising a plurality of chunks of at least 4 modules each, and including a two-dimensional alignment pattern AP comprising a first zone of light modules adjacent to a second zone of which modules have colors representative of the remaining colors of the color palette;
including in each barcode element BE a corresponding barcode element error-correcting code BE-ECC and a locator BE-L comprising a barcode element orientation pattern, each locator BE-L of a barcode element BE further including encoded locator data LD comprising decoding data for decoding said barcode element; and
in case the two-dimensional barcode comprises a plurality of barcode elements, further including in respective locator data of each barcode element BE a corresponding identification number of said barcode element.

12. The method according to claim 11, further comprising the steps of:
including in each chunk CK of a data block DB a corresponding chunk error-detecting code CK-EDC; and
including in each data block DB a corresponding data block error-detecting code DB-EDC.

13. A system for encoding data into a two-dimensional barcode B and marking the two-dimensional barcode on a substrate, comprising a marking device, a processor equipped with a memory, a communication unit adapted to receive data and send data to the marking device through a communication link, wherein:
the communication unit is adapted to receive primary data to be encoded and store the received primary data in the memory;
the processor is adapted to
encode and format the received primary data into at least one barcode element BE made up of elementary two-dimensional modules, a color a module being selected from a color palette of a plurality of distinct reference colors including dark and light, wherein encoded data of each barcode element BE are split into a plurality of two-dimensional data blocks, each data block DB comprising a plurality of chunks of at least 4 modules each, and each data block DB including a two-dimensional alignment pattern AP comprising a first zone of light modules adjacent to a second zone of which modules are representative of the remaining colors of the color palette;
configure for each barcode element BE a corresponding barcode error-correcting code BE-ECC and include each configured barcode element error-correcting code into its barcode element;
include in a barcode element BE a locator BE-L comprising a barcode element orientation pattern, each locator BE-L of a barcode element BE being formatted to include encoded locator data LD comprising decoding data for decoding said barcode element;
in case the two-dimensional barcode comprises a plurality of barcode elements, further include in respective locator data of each barcode element BE a corresponding identification number of said barcode element; and
send the obtained two-dimensional barcode encoded data together with formatting data to the marking device via the communication unit;
the marking device is adapted to mark on the substrate the received encoded data according to the received formatting data with an arrangement of modules corresponding to said at least one barcode element BE comprising said two-dimensional data blocks, chunks, two-dimensional alignment patterns, barcode element error-correcting code BE-ECC and locator BE-L.

14. The system of claim 13, wherein the processor is adapted to include in a chunk CK of a data block DB a corresponding chunk error-detecting code CK-EDC.

15. The system of claim 13, wherein the processor is adapted to configure a data block error-detecting code DB-EDC of a corresponding data block DB and include the configured data block error-detecting code DB-EDC in the data block DB.

* * * * *